(12) United States Patent
Contadini et al.

(10) Patent No.: US 8,815,393 B2
(45) Date of Patent: Aug. 26, 2014

(54) PROCESS FOR OBTAINING FUNCTIONALIZED NANOPARTICULATE MAGNETIC FERRITES FOR EASY DISPERSION AND MAGNETIC FERRITES OBTAINED THROUGH THE SAME

(75) Inventors: Jose Fernando Contadini, Belo Horizonte (BR); Tarik Della Santina Mohallem, Belo Horizonte (BR); Taiane Guedes Fonseca De Souza, Belo Horizonte (BR)

(73) Assignee: Nanum Nanotecnologia S/A, Minas Gerais (BR)

( * ) Notice: Subject to any disclaimer, the term of this patent is extended or adjusted under 35 U.S.C. 154(b) by 0 days.

(21) Appl. No.: 13/812,118

(22) PCT Filed: May 3, 2011

(86) PCT No.: PCT/IB2011/051952
§ 371 (c)(1),
(2), (4) Date: Jan. 24, 2013

(87) PCT Pub. No.: WO2012/014094
PCT Pub. Date: Feb. 2, 2012

(65) Prior Publication Data
US 2013/0130035 A1 May 23, 2013

(30) Foreign Application Priority Data
Jul. 26, 2010 (BR) .................................. 1002273

(51) Int. Cl.
*B32B 5/16* (2006.01)
(52) U.S. Cl.
USPC ..... 428/402; 428/842.3; 427/127; 252/62.56; 977/838
(58) Field of Classification Search
USPC ............. 428/402, 842.3; 427/127; 252/62.56; 977/838
See application file for complete search history.

(56) References Cited

U.S. PATENT DOCUMENTS

| | | | | |
|---|---|---|---|---|
| 4,094,804 A | * | 6/1978 | Shimoiizaka | 252/62.52 |
| 6,720,074 B2 | * | 4/2004 | Xiao et al. | 428/842.4 |
| 7,223,438 B2 | * | 5/2007 | Mirkin et al. | 427/127 |
| 7,485,366 B2 | * | 2/2009 | Ma et al. | 428/403 |
| 8,070,974 B2 | * | 12/2011 | Gablenz et al. | 252/62.51 R |
| 2007/0087385 A1 | * | 4/2007 | Muller-Schulte | 435/7.1 |
| 2009/0098411 A1 | * | 4/2009 | Nakagawa | 428/800 |

OTHER PUBLICATIONS

International Search Report of PCT/IB2011/051952 dated Nov. 16, 2011.
International Written Opinion of PCT/IB2011/051952 dated Nov. 16, 2011.

* cited by examiner

*Primary Examiner* — Leszek Kiliman
(74) *Attorney, Agent, or Firm* — Amster, Rothstein & Ebenstein LLP

(57) ABSTRACT

The present invention refer to a innovative process for obtaining nanoparticulate magnetic ferrites, at low temperatures, simple or mixed, functionalized by organic molecules, for dispersion of these nanoparticles in polar or nonpolar media, and the same particles dispersed in a liquid medium, also known as ferrofluids. The present invention enables obtaining both simple ferrites ($MFe_2O_4$ or $MFe_{12}O_{19}$) and mixed ferrites ($N_x M_{(1-x)} Fe_2O_4$ or $N_{1-Y} M_{x+Y} Fe_{(2-x)} O_4$; as example) where M and N can be metals, such as Sm, La, Bi, Ba, Mo, Sr, Ni, Fe, Mn, Cr, etc., through the coprecipitation method, functionalized by organic molecules containing carboxylic groups, which are polymers, or long chain acids or short chain acids, containing mono, di or tricarboxylic groups and/or alcohols, whose dispersion in polar or nonpolar media is improved. The present invention enables also obtaining ferrofluids, through the mixture of the obtained magnetic particles with an appropriate liquid carrier. The substitution of some elements in the ferrites may yield specific mechanical, optical and/or magnetic properties.

10 Claims, 1 Drawing Sheet

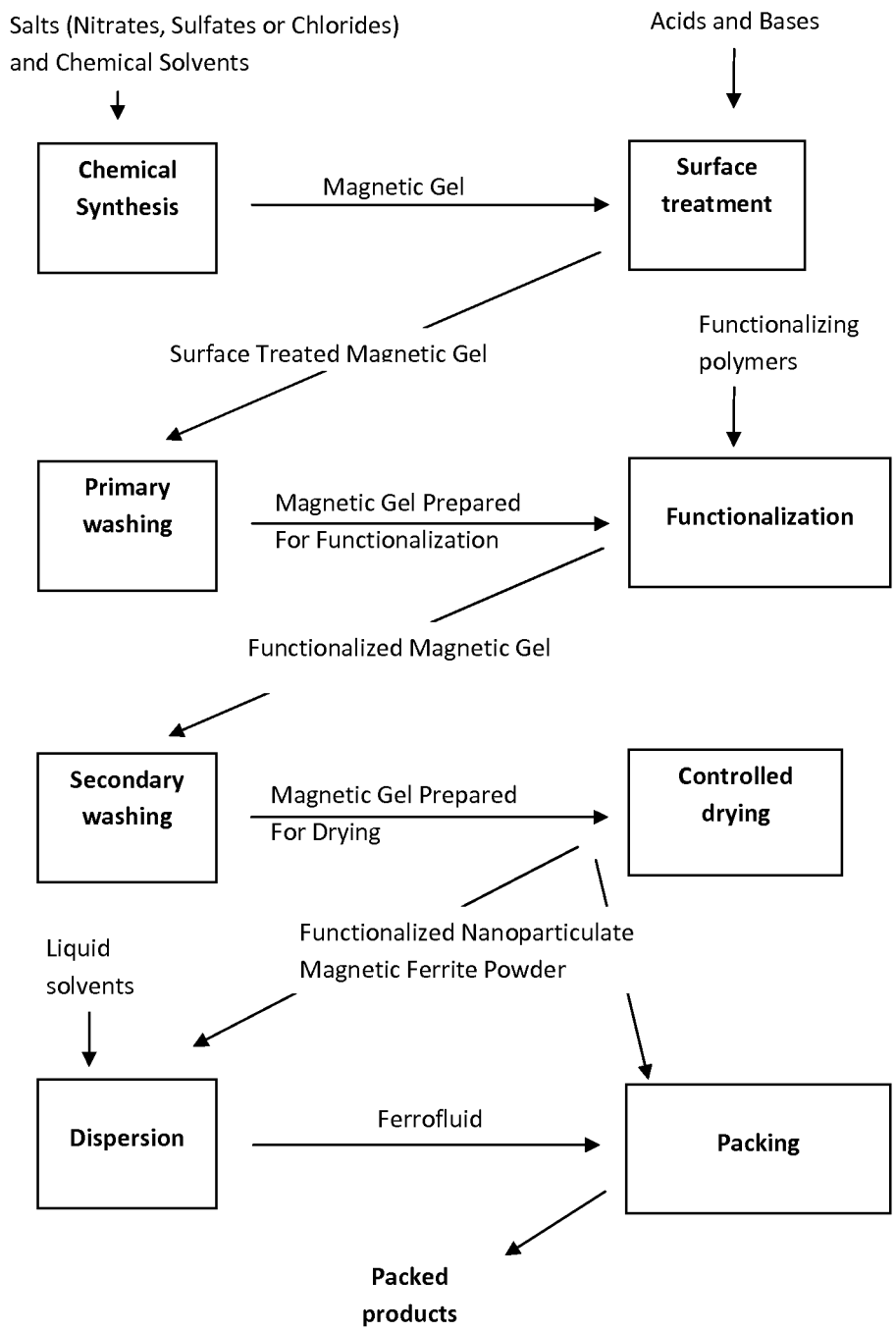

PROCESS FOR OBTAINING FUNCTIONALIZED NANOPARTICULATE MAGNETIC FERRITES FOR EASY DISPERSION AND MAGNETIC FERRITES OBTAINED THROUGH THE SAME

FIELD OF THE INVENTION

The present invention refer to an innovative process for obtaining nanoparticulate magnetic ferrites, at low temperatures, simple or mixed, functionalized by organic molecules, for dispersion of these particles in polar or nonpolar media, and to the same ones dispersed in a liquid media, also known as ferrofluids.

BACKGROUND OF THE INVENTION

Ferrites are ferrimagnetic iron oxides which exhibit spontaneous magnetization, however with magnetic response lower than ferromagnetic materials such as the transition metals. They are crystallographically shared in two main groups: cubic and hexagonal. In the group of cubic ferrites the general chemical formula is of the type: $MO.Fe2O3$. The group of hexagonal ferrites has the formula $MOFe12O18$ where M is a metal in a positive oxidation state, which can be Ba, Sr, Zn, Cu, Ni, Co, Fe, or Mn, or even a combination of those. The main part of the ferrofluids described in the literature are produced already in the liquid form, which hampers the control of the solids loading in the solution, obligates to transport all the liquid medium of the dispersion to the local of use and limits the changing of the solvents in the composition of the same. Furthermore, the concentrations of solids informed are low, in general, around 6% by volume.

Most magnetic particles that pass through the stage of formation of the powder depend on the exposure of the material to high temperatures, i.e. temperatures higher than 250° C. The processes already known depend on the introduction of surfactants and it is still necessary the utilization of high shear mixing equipments to guarantee that the dispersion will occur and remain stable under a minimum period, appropriate to the market (several months). Finally, as they are simple ferrites, it is not possible to vary and to control the saturation and magnetic remanence or the coercivity.

Many processes use the conventional method, or ceramic one, to synthesize ferrites. That one consists of a mixture of iron oxides and other metal oxides followed by steps of calcination and milling. The milling process may generate fine particles, however the granulometric distribution of the final product is very broad.

Hereafter we mention some known processes of the state of the technique:

The U.S. Pat. No. 6,811,718 describes a process that mix the oxide or precursor salts of the desired ferrite, containing specific surface area values in a well established range, until obtaining a slurry which is heated to high temperatures and then milled.

The U.S. Pat. No. 4,094,804 describes a process to disperse magnetic particles smaller than 15 nm in water. For so, they add a colloidal iron oxide solution to a mixture containing a salt of a fatty acid with 18 carbons or more. After that, the formation of a precipitate occurs and it is separated from the supernatant and dispersed in a medium containing an anionic surfactant with 8 to 30 carbons or a nonionic surfactant with 8 to 20 carbons.

The U.S. Pat. No. 6,767,396, U.S. Pat. No. 6,746,527, U.S. Pat. No. 6,726,759 reveal processes which yield a magnetic fluid with application in inks for MICR printers, from the dispersion of a magnetic iron oxide with average particle size smaller than 500 nm. For that they prepared a pre-dispersion by milling these particles in the presence of a dispersant. The ink is obtained from the mixture of this paste to more dispersing aids during processes of milling followed by some filtration steps.

The U.S. Pat. No. 5,958,282 (1999) describes a process which mixes non-magnetic iron oxide ($Fe_2O_3$) with water and a commercial surfactant, (Westvaco Reax 88B"), in a ball mill, under stirring, at a speed of 3500 RPM during 4 hours. The mixture is heated to 70° C. They obtained a magnetic fluid composed of magnetite particles with size in the order of 10 nm. The magnetic fluid presented magnetic saturation in the range 108-178 Gauss (approximately 8500 A/m).

The U.S. Pat. No. 6,048,920 (2000) describes in its process an ion exchange resin to capture iron sulfide particles which were then oxidized by a suitable base, to obtain resin bound magnetite nanoparticles. The obtained particles are in the range of 20-120 nanometers and presents saturation magnetization equal to 16.1 A/m.

The U.S. Pat. No. 4,452,773, also known as Molday Method, describes a well explored process of which there are already many modifications. The process is based on the precipitation of iron oxide in an alkaline solution containing a water-soluble polysaccharide, preferably dextran. The colloidal size composite particles comprise iron oxide crystals covered with dextran. As described, the size of the iron oxide particles obtained here is very heterogeneous.

The U.S. Pat. No. 4,951,675 (1990) describes a process for obtaining a biodegradable magnetic ferrofluid making some modification in the Molday method. Using a mean molecular weight dextran (75.000 Daltons) or a bovine serum albumin as covering materials, they prepared magnetic particle with sizes ranging from 1 to 500 nm. The use of centrifugation (1500 g for 15 minutes), dialysis (380 L of distilled water during three days, changing the water every day by each 80 ml of magnetic fluid) and ultrafiltration together allowed them to obtain a magnetic fluid whose average particle size was 120 to 150 nm, approximately.

The U.S. Pat. No. 4,109,004 describes a process for obtaining magnetic fluids from mixing petroleum sulphonate in aqueous medium followed by dissolution of iron salts, addition of the base and bubbling of carbonic gas. The mixture is stirred, heated and centrifuged. The supernatant obtained is a magnetic liquid.

The U.S. Pat. No. 5,500,141 describes a process for obtaining magnetic fluids for use in inkjet printers. For that, a Ni and/or Co substituted Mn—Zn ferrite was synthesized by the coprecipitation method followed by drying at 80° C. The utilization of Mn—Zn leads to an increase of the saturation magnetization and magnetic susceptibility which enables lower solid loadings and viscosity. The obtained powder was dispersed in a high shear mixer with the addition of a dispersant. The fluid was centrifuged and has saturation magnetization higher than 32 mT.

The U.S. Pat. No. 4,026,713 (1997) describes a process which mixes magnetite, glycerol, mono-lower alkyl ether of ethylene glycol and low molecular weight polyethylene diol, 200 g/mol, for obtaining a magnetic fluid composed of particles with sizes ranging from 5 to 30 nm and magnetic moment in the range of 25-30 A m2/Kg. This method also uses the centrifugation.

The U.S. Pat. No. 3,990,981 (1976) e U.S. Pat. No. 4,107, 063 (1978) reveal a process for obtaining magnetic fluids to use as magnetic printing inks. The magnetic particles were covered with organic sulphates, sulphonates or amino carboxylates. They were then mixed with dispersants or surfactants. Both processes used centrifugation and took advantage just of the supernatant. The size of the magnetic particles was in the range 5-30 nm and presented magnetic moment equal to 20-25 A m2/Kg. So small size particles can generate the effect of super paramagnetism, which is not appropriate to the suggested application, unlike the product claimed in the present patent.

The U.S. Pat. No. 5,240,626 (1993) describes a process for obtaining an aqueous magnetic fluid based on magnetite, covering the magnetic particles with carboxy-functional polymers such as polymethacrylate. The particles were dried and re-dispersed in the desired medium with the aid of a surfactant or dispersant. Its size was in the range 2-20 nanometers and they presented a magnetic moment of 30 A m2/Kg.

The U.S. Pat. No. 4,161,454 describes a process for obtaining magnetite covered with copolymers, as powder, dried by a spray drier. The magnetic fluid consists of a mixture of this powder with a medium containing toluene and dispersants.

Generally there are several methods for obtaining magnetic fluids, which are in consequence fluids with differentiated characteristics. The different methods aim to obtain not just simpler routes, but also enhance the properties responsible for a better performance in the applications for which they were developed.

The present invention uses special drying processes similar to the patents PI0901968-5 and PI0805592-2. However, after the functionalization step the material can be mixed directly with the solvent used in the preparation of the ferrofluid or be dried by special processes. The problem related to the direct mixture is the stoichiometric control of the fluid.

An important characteristic of the composites obtained in the present invention is their being nanoparticulate powders. As it is a material for extremely simple dispersion in the desired medium (water, for example), it is easy to obtain dispersions with different and well defined concentrations without addition of dispersants. As an example, 70 weight percent dispersions can be obtained without the aid of high shear mixers or special laminas.

For obtaining ferrofluids in aqueous medium from the dry powder, the control of the solids loading is complicated, because it needs the addition of other surfactants or dispersants that ensure the prolonged dispersion of the magnetic particles. The final product of the present invention is a dry powder of functionalized nanoparticulate ferrite, which can be added to compatible solvents, without needing extra addition of dispersants or surfactants.

The present invention enables obtaining both simple ferrites (MFe2O4 or MFe12O19) and mixed ferrites (Nx M(1-x) Fe2O4 or N1-y Mx+Y Fe(2-x)O4, for example) where M and N can be metals, such as Sm, La, Bi, Ba, Mo, Sr, Ni, Co, Ni, Fe, Mn, Cr, etc., through the coprecipitation method, functionalized by organic molecules containing carboxylic groups, which are polymers, or long chain acids or short chain acids, containing mono, di or tricarboxylic groups and/or alcohols, whose dispersion in polar or nonpolar media is improved. The present invention enables also obtaining ferrofluids, through the mixture of the obtained magnetic particles with an appropriate liquid carrier. The substitution of some elements in the ferrites may yield specific mechanical, optical and/or magnetic properties.

DESCRIPTION OF THE DRAWING

FIG. 1 presents a flowchart of the method claimed in the present invention.

AIM OF THE INVENTION

The principal aim of this invention is to provide an innovative method that enables the production of functionalized ferrite nanoparticles in the form of dry powder, which lead to an excellent control of the solids concentration in the ferrofluids, in a simple and practical way.

Other aim of the present invention is the production of extremely concentrated ferrofluids, with ferrite loadings from 60 to 80%, preferably 70 weight percent, remaining stable for a long period (several months), even under the action of a strong magnetic field (3 to 5 teslas).

The process claimed in the present invention also aims to afford the production of magnetic ferrites at low temperatures, with the flexibility of the project of functionalization of the ferrites to eliminate the use of dispersant and/or surfactant during the formulation of the ferrofluid, since the nanoparticles are already surface treated.

Finally, one of the aims of the present invention is the possibility of controlling the variation of the magnetic saturation, magnetic remanence and coercivity from the production of mixed ferrites.

DETAILED DESCRIPTION OF THE INVENTION

The process for obtaining functionalized magnetic ferrites nanoparticles for easy dispersion, objective of the present invention, comprises firstly the coprecipitation of the ferrite from a solution containing the precursors salts such as iron, cobalt, barium, strontium, manganese and other salts, followed by the addition of a base, which can be ammonium hydroxide, sodium hydroxide, potassium hydroxide, among others. The addition of a reducing agent may be necessary depending on the desired ferrite and the precursor oxidation level (nox). The precipitation occurs under stirring in appropriate and controlled pH and temperature. The precipitate is then surface treated with salts, inorganic acids and/or bases in order to modify its surface, enabling the next step, the functionalization. That procedure may involve stirring, heating and washing steps in order to eliminate ions that damage the functionalization. This one occurs by the addition of the surface modifying agent in appropriate pH and temperature. The process is concluded by washing the product, which may be done by filtration, dialysis and/or mixing water and solvents. 0-20% of dispersants compatible to the molecule used in the functionalization, such as ethylene glycol, trietanolamine and others, can be added before the drying step. Later the product is dried under controlled conditions. Hypercritical drying, spray drying, freeze drying and special stove drying under controlled temperatures between 60 to 80° C. are considered controlled dryings. Hypercritical dryings are processes that use pressure values between 140 and 220 bar and temperatures values between 270 and 320° C.

Temperature values below 250° C. were considered low temperatures. The functionalization consists of the introduction of functional groups (atoms or molecules) at the surface of a material. These functional groups chemically bond to the surface of the material and change its characteristics.

Nanoparticulate materials are composed of bodies with nanometric dimensions, meaningful mass and own properties. They are similar to particulate materials with particle size in nanometric scale ($10^{-9}$ meters).

The process for obtaining functionalized nanoparticulate magnetic ferrites for easy dispersion in the present invention will be better understood through the detailed description of the procedural steps.

FIG. 1 illustrates the flowchart of the claimed method, which is described hereafter comparing its differences to common methods and highlighting its advantages with respect to these methods.

The new revealed method allows obtaining particles whose average size is between 15 and 300 nm, with specific surface area between 10 and 120 $M^2/g$, from the control of the synthesis parameters such as temperature, salt initial concentration and drying conditions.

Firstly the chemical synthesis is made in an appropriate reactor fed with salts (nitrates, sulfates or chlorides) and chemical solvents and yielding a magnetic gel.

Afterwards, a surface treatment is carried on the magnetic gel by adding salts, acids and/or bases. So a magnetic gel is obtained with the surface prepared to the functionalization.

Then a primary washing with deionized water is carried on the magnetic gel removing the excess salts.

After so, the functionalization of the saltless and surface treated magnetic gel is carried by adding functionalizing agents which form a magnetic particle with desired surface characteristics, such as hydrophilic or hydrophobic surfaces (affinity to water or oil respectively). After the functionalized magnetic gel is obtained, a secondary washing is carried by adding deionized water, removing the excess functionalizing agents.

Then a controlled drying is carried on the functionalized magnetic gel through freeze-drying, hypercritical drying or spray-drying, wherein the magnetic gel is the feeding material and the nanoparticulate functionalized powder is the final product.

From this step the nanoparticulate functionalized powder can be packed, preferably in an airtight plastic so it can be commercialized, or dispersed in a solvent to produce a ferrofluid.

Among the advantages of the present invention we can quote seven major ones:

1. Functionalized ferrites are obtained as powders, which leads to:
   a. Excellent control of the ferrofluid solids concentration, in a simple and practice manner, since it is not necessary the use of equipments to measure the solids loading, for example.
   b. Reduction in transport costs enabling the dispersion of the material in the place where the ferrofluid is produced, avoiding transport of solvents.
   c. Enables more flexibility for the user in the choice of the ferrofluid solvent.
2. Possibility of ferrofluid production with extremely high concentrations, with ferrites loadings up to 70 weight percent, remaining stable for a long period (several months), even under the action of a strong magnetic field (from 3 to 5 tesla).
3. Flexibility of the project of functionalization of the ferrites to eliminate the use of dispersant and/or surfactant during the ferrofluid formulation, since the nanoparticles are already surface treated.
4. Elimination of the need of equipments to produce ferrofluids with high shear rates, such as specific mixers or mills.
5. Production of magnetic ferrites at low temperatures.
6. Obtaining of fluids in a varied pH range, including neutral pH, around 7, which is difficult to be obtained through other processes in literature.
7. Possibility of controlling the variation of the magnetic saturation, magnetic remanence and coercivity from the production of mixed ferrites.

Most productive methods in literature and the products obtained from them are extremely limited relating to the variations in composition and/or in physical characteristics. Considering the use of the productive method in this present invention, which is highly innovative in the control of the parameters of the particles/ferrofluids produced, particles were developed with unique characteristics in terms of chemical composition, magnetization, size, granulometric dispersion range, functionalizations for polar or nonpolar dispersions and synthesis temperatures.

The functionalized nanoparticulate magnetic ferrites of the present invention present a granulometric distribution varying between 1 and 50 nm, average size between 15 and 300 nm, with specific surface area between 10 and 120 $M^2/g$, and magnetic saturation varying from 05 to 80 emu/g, wherein the magnetic remanence varies from 1 to 60 emu/g and the magnetic coercivity varies from 10 to 3000 Oe. The referred ferrites can be simple ($MFe_2O_4$ where M represents a metal) or mixed ($N_x M_{(1-x)} Fe_2O_4$ or $N_{1-y} M_{x+y} Fe_{(2-x)}O4$, for example), wherein M and N can be metals, such as Sm, La, Bi, Ba, Mo, Sr, Ni, Co, Ni, Fe, Mn, Cr, and others.

Now, for ferrofluids obtained from these special particles, we can still include the possibility of creating these products with high solid mass loadings, with the liquid medium appropriate to each application, simple, without additional dispersants and/or surfactants and with the dispersion ensured for a long time, as they are dispersions with strong bonds promoted by the functionalizations.

The referred nanoparticulate ferrites can be used in the composition of magnetic inks which can be used in inkjet printers.

Hereafter we present some examples of the claimed method:

Example I

Obtaining the Ferrite Powder with Polar Functionalization

Appropriate amounts of iron nitrate (III) salt and other salts (raw materials) such as zinc, aluminum, magnesium, cobalt, bismuth, manganese, strontium and/or barium salts are mixed in 250 to 2000 ml of deionized water to form the compound. While expecting the solubilization of salts the mixture is heated to the appropriate temperature. After the desired temperature is reached and the salts are solubilized, a solution of bases or acids is added to the mixture to adjust to the desired pH.

The precipitate is heated between 60 and 90° C. and maintained under stirring and heating (Synthesis). This step is followed by the addition of bases, acids and salts for surface preparation (Surface Treatment). Then the product is washed by decanting in a Primary Washing. The functionalizing agent, which can be oxalic acid, citric acid, tartaric acid and/or amino acids, is added and pH is again adjusted with addition of acids and bases. This mixture is maintained under stirring and heating from 1 to 4 hours (Functionalization).

The obtained material is washed by decanting with a mixture of water and organic solvents, dialysis or filtration (Secondary Washing) and, next, it is dried by the controlled drying processes (hypercritical, spray-drying or freeze drying).

For this synthetic route, the average size of the obtained particles was around 50 nm, using images obtained by Atomic Force Microscopy (AFM). After dried, the material was packed.

Example II

Obtaining Ferrite Powder with Non Polar Functionalization

The material is prepared according to EXAMPLE 1 until the Primary Washing step.

The functionalizing agent, which can be oleic acid, palmitic acid, and/or amino acids, is added and the pH is adjusted by adding bases and acids. This mixture is maintained under mechanical stirring and heating for 1 to 4 hours (Functionalization).

The obtained material is washed by decanting with a mixture of water and organic solvents, dialysis or filtration (Secondary Washing) and next, it is dried by the controlled drying processes (in a furnace, hypercritical, spray-drying or freeze drying).

For this synthetic route, the average size of the obtained particles resulted in around 50 nm, using images obtained by Atomic Force Microscopy (AFM). After dried, the material was packed.

Example III

Obtaining Ferrofluids with Polar Liquid Base

The material is prepared according to EXAMPLE 1 until the drying step.

Next, the functionalized ferrite is added to a mixer wherein the polar liquid base considered (water, for example) is also added at the intended concentration (60 weight percent, for example). The mixture is carried on for approximately 30 minutes, producing the considered ferrofluid. After mixing, the ferrofluid is packed in a vessel appropriate for liquids.

Example Iv

Obtaining Ferrofluids with Nonpolar Liquid Base

The material is prepared according to EXAMPLE II until the drying step.

Next, the functionalized ferrite is added to a mixer wherein is also added the nonpolar liquid base (mineral oil, for example) at the intended concentration (30 weight percent, for example). The mixture is carried for approximately 45 minutes, producing the considered ferrofluid. After mixing, the ferrofluid is packed in a vessel appropriate for liquids.

People who know the technique will easily understand that modifications can be carried on the invention without escaping from the stated concepts in the preceding description. These modifications must be considered included in the scope of the invention. Consequently, the particular concretizations described in detail previously are only illustrative and not limiting regarding the scope of the invention, to which the full extension of the attached claims and all or whatever equivalents of the same must be given.

The invention claimed is:

1. A process to obtain functionalized magnetic ferrites nanoparticles comprising the following steps:
(a) initially a chemical synthesis is performed in a reactor, at a temperature ranging from 60 to 90° C., under stirring, fed with precursors salts such as nitrates, sulfates or chlorides, chemical solvents, in which bases or acids are added to pH adjustment, yielding as product a magnetic gel;
(b) the magnetic gel from step (a) is submitted to a surface treatment in a second reactor through the addition of acids and bases in order to obtain the magnetic gel with the surface prepared for functionalization;
(c) the magnetic gel obtained from step (b) is submitted to a primary washing by decanting with deionized water, removing the excess salts;
(d) functionalization of the magnetic gel obtained in (c) through coprecipitation, adding polars and nonpolars functionalizing agents in order to form a magnetic particle with desired hydrophilic or hydrophobic surface characteristics, in which bases and acids are added for pH adjustment, where the yielded mixture is maintained under mechanical stirring and heating during the period from 1 to 4 hours;
(e) the magnetic particles obtained in step (d) are submitted to a secondary washing by decanting, dialysis or filtration, with addition of deionized water and organic solvents, removing the excess functionalizing agents;
(f) the material obtained in step (e) is submitted to a controlled drying step, through hypercritical drying, freeze-drying or spray drying, in which the functionalized magnetic gel is transformed in a functionalized nanoparticulate powder;
(g) the functionalized nanoparticulate powder obtained from step (f) is packed, preferably in an airtight plastic, in order to be commercialized as powder, or dispersed in a solvent and bottled to be commercialized as ferrofluid.

2. A process to obtain functionalized magnetic ferrite nanoparticles, according to the claim 1, characterized by the polar functionalizing agent from step (d) being selected among the group of oxalic acid, citric acid, tartaric acid and amino acids.

3. A process to obtain functionalized magnetic ferrite nanoparticles, according to the claim 1, characterized by the nonpolar functionalizing agent from step (d) being selected among the group of oleic acid, palmitic acid and benzoic acid.

4. A process to obtain functionalized magnetic ferrite nanoparticles, according to the claim 1, characterized by the fact that in step (g), to obtain the ferrofluid, the solvent is a polar or nonpolar liquid basis, and the obtained ferrofluids contain a concentration of ferrites ranging up to 80 weight percent.

5. A process to obtain functionalized magnetic ferrite nanoparticles, according to the claim 4, characterized by the fact that the solvent is a polar liquid basis, preferably water, in a concentration between up to 80 weight percent.

6. A process to obtain functionalized magnetic ferrite nanoparticles, according to the claim 4, characterized by the fact that the solvent is a nonpolar liquid basis, like a mineral or vegetable oil, in a concentration up to 80 weight percent.

7. Magnetic ferrites, characterized by being nanoparticulate powder obtained through the process as described in the claim 1, comprising granulometric distribution ranging from 05 to 100 nm, average particle size ranging from 10 to 300 nm and specific surface area from up to 120 $m^2/g$.

8. Magnetic ferrites, according to claim 7, characterized by comprising magnetic saturation up to 400 emu/g, magnetic remanence up to 60 emu/g and magnetic coercivity up to 3,000 Oe.

9. Magnetic ferrites, according to claim 7, characterized by being simple ferrites, comprising the formula $MFe_2O_4$, in which M represents a metal, or being mixed ferrites, comprising the formula $N_x M_{(1-x)} Fe_2 O_4$ or $N_{1-y} M_{x+y} Fe_{(2-x)} O_4$, in which M and N are metals.

10. Magnetic ferrites, according to claim 9, characterized by the fact that M and N may be Sm, La, Bi, Ba, Mo, Sr, Ni, Co, Fe, Mn, Cr or equivalent metals.

\* \* \* \* \*